United States Patent [19]
James, III

[11] 3,804,278
[45] Apr. 16, 1974

[54] TAILGATE CONVEYOR

[75] Inventor: William T. James, III, Canfield, Ohio

[73] Assignee: The Renner Company, Youngstown, Ohio

[22] Filed: Sept. 15, 1972

[21] Appl. No.: 289,631

[52] U.S. Cl............ 214/509, 214/83.26, 214/83.32
[51] Int. Cl............................................ B60p 1/04
[58] Field of Search..... 214/508, 509, 83.36, 83.32, 214/83.14, 83.26, 519, 520, 521, 522

[56] References Cited
UNITED STATES PATENTS

| | | | |
|---|---|---|---|
| 2,490,212 | 12/1949 | Davis | 214/509 X |
| 3,331,519 | 7/1967 | Jennings, Jr. | 214/509 |
| 2,419,824 | 4/1947 | Davis | 214/509 |

*Primary Examiner*—Albert J. Makay
*Attorney, Agent, or Firm*—Webster B. Harpman

[57] ABSTRACT

A tailgate conveyor for asphalt handling trucks and the like positions a main screw-type conveyor transversely of the tailgate of the truck for reception of material therefrom and provides a movable extension conveyor for operation on either end of the main conveyor so that material received in the main conveyor from the truck may be moved to either end thereof and into the movable extension conveyor and delivered to any desired positioned outwardly therefrom.

5 Claims, 4 Drawing Figures

TAILGATE CONVEYOR

BACKGROUND OF THE INVENTION

1. Field of the Invention

This invention relates to tailgate conveyor mechanisms of the type normally employed to receive material from a truck body and deliver it to one side thereof.

2. Description of the Prior Art

Prior structures of this type have utilized conveyors for receiving material from the truck and moving it to one side thereof and conveyor structures have been known in the art including extensions. See for example U.S. Pat. Nos. 2,834,451 and 2,824,660.

This invention provides for the interchangability of the extension conveyor from one side of the main conveyor to the other with the appropriate interconnection of the power means so that the device may be used to deliver asphaltic materials or the like to a remote point at either side of a truck having a tailgate conveyor attachment.

SUMMARY OF THE INVENTION

A tailgate conveyor comprises a principal conveyor positioned transversely with respect to a truck body and adjacent the tailgate thereof and provided with means for attachment to the truck body and the tailgate so as to be capable of being moved along with the truck and operated during such movement. An extension conveyor is attachable at either end of the main conveyor and movable to various positions so as to discharge the material at a remote point with respect to the main conveyor.

DESCRIPTION OF THE PREFERRED EMBODIMENT

Figure 1:
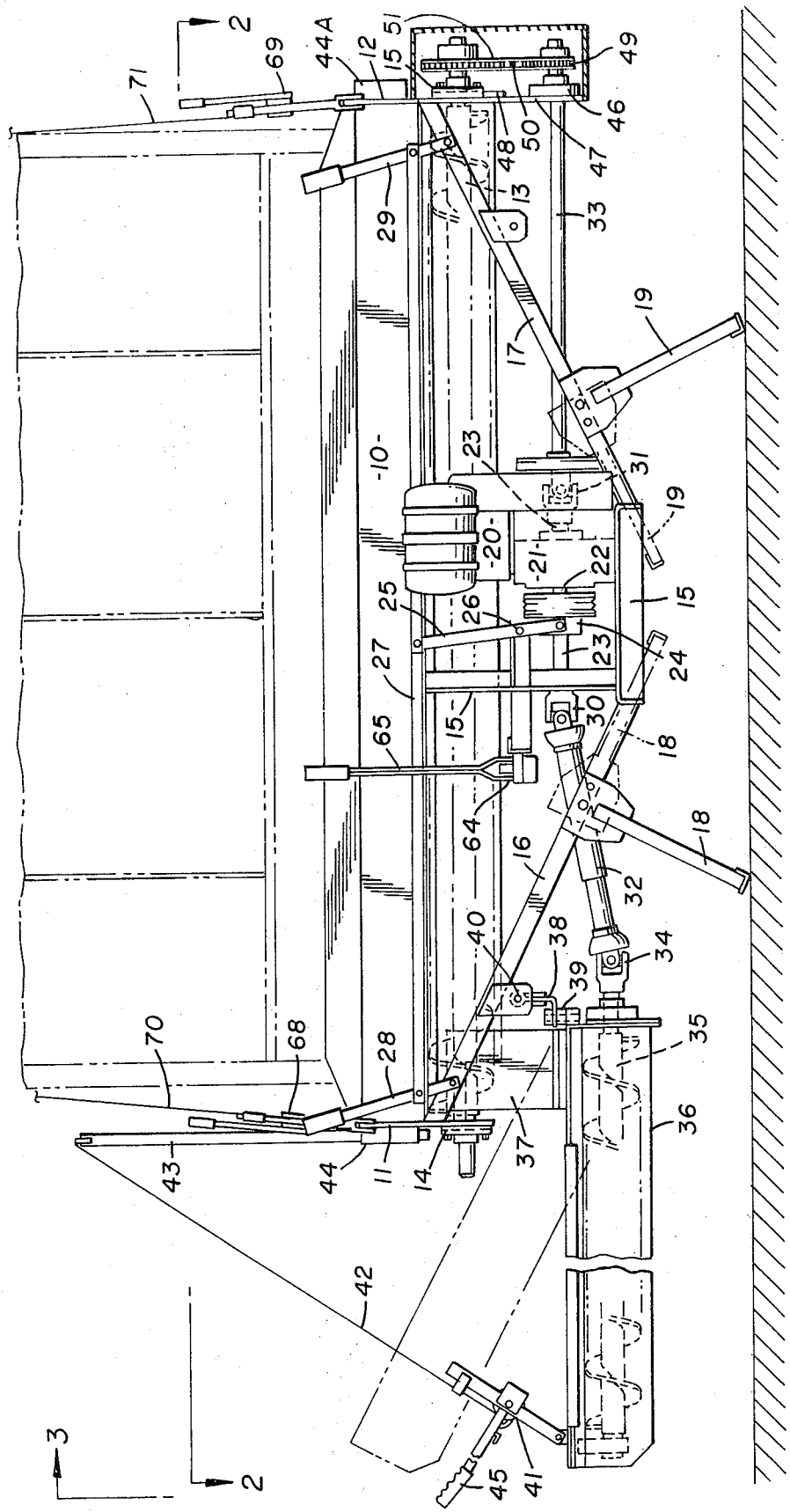
FIG. 1 is a front plan view of the tailgate conveyor with broken lines indicating the tailgate of a dump truck relative thereto.

In its simplest form the tailgate conveyor of this invention is comprised of a longitudinal open topped housing 10 with closed ends 11 and 12. A conveyor screw 13 is disposed longitudinally in the open topped housing 10 adjacent the lower portion thereof which is of a comparable curved configuration as will be understood by those skilled in the art and the ends of the conveyor screw 13 are rotatably positioned in journals 14 and 15 on the ends 11 and 12 respectively. A framework 15 is positioned midway between the ends of the open topped housing 10 and attached thereto and includes diagonal frame members 16 and 17 which extend therefrom in opposite directions to the ends 11 and 12 of the open topped housing 10. Foldable legs 18 and 19 are pivotally attached to the diagonal frame members 16 and 17 respectively and may be seen in ground engaging position in solid lines in FIG. 1 of the drawings and in elevated position in broken lines therein.

The frame 15 supports an internal combustion engine 20 and a directly connected gear box 21 which has a drive shaft 22 and a driven shaft 23 extending out of the opposite sides thereof. A clutch 24 is arranged to control the belt driven connection between the engine 20 and the driven shaft 22 and the clutch is operated by a lever 25 pivoted intermediate its ends to a portion of the frame 15 by pivot 26 and at its upper end to a transversely extending actuating arm 27 which in turn has operating handles 28 and 29 pivotally engaging its opposite ends and located adjacent the opposite ends of the tailgate conveyor. The arrangement is such that when the clutch 24 is engaged motion is imparted to the drive shaft 22 of the gear box 21 and the shaft 23 which extends transversely through the gear box 21 is thereby rotated. Universal joint couplings 30 and 31 on the ends of the driven shaft 23 provide quick detachable couplings with drive shafts 32 and 33 respectively.

The drive shaft 32 extends transversely to a second univeral joint coupling 34 by means of which rotary motion is imparted to one end of a conveyor screw 35 in a troughshaped extension conveyor body 36 which is arranged with one end thereof below one end of the open topped housing 10 so that it can communicate therewith by means of a chute 37 which is formed of flexible material. The end of the extension conveyor 36 adjacent the open topped housing 10 is supported by an L-shaped bracket 38 which is pivoted to a vertical pivot 39 on the extension conveyor 36 and to a horizontal pivot 40 on the diagonal frame 16 of the tailgate conveyor.

The extension conveyor 36 is thereby capable of receiving material from the main conveyor screw 13 and at the same time being moved upwardly and downwardly and in an arcuate motion forwardly and backwardly by reason of its pivotal attachment hereinbefore described. The outer end of the extension conveyor 36 has a hand operated winch 41 attached thereto with a cable 42 of the winch extending upwardly to a point of attachment at the upper end of a mast 43 which in turn is positioned in a socket 44 on the end 11 of the open topped housing of the tailgate conveyor. The winch 41 includes an actuating handle 45.

The drive shaft 33 extends in the opposite direction from the gear box 22 and more specifically the coupling 31 to a journal 46 on a support plate 47 which is provided with offset attachment arms 48 which are releasably secured to the fasteners mounting the journel 15 to the end 12 of the open topped housing 10. A gear 49 on the shaft 33 is connected by a chain 50 with a gear 51 on the end of the shaft comprising the journeled extension of the main conveyor screw 13 heretofore referred to.

Those skilled in the art will observe that the structure is such that it can be disassembled readily so as to free the support plate 47 and thereby the positioning of the driven shaft 33.

Figure 2:
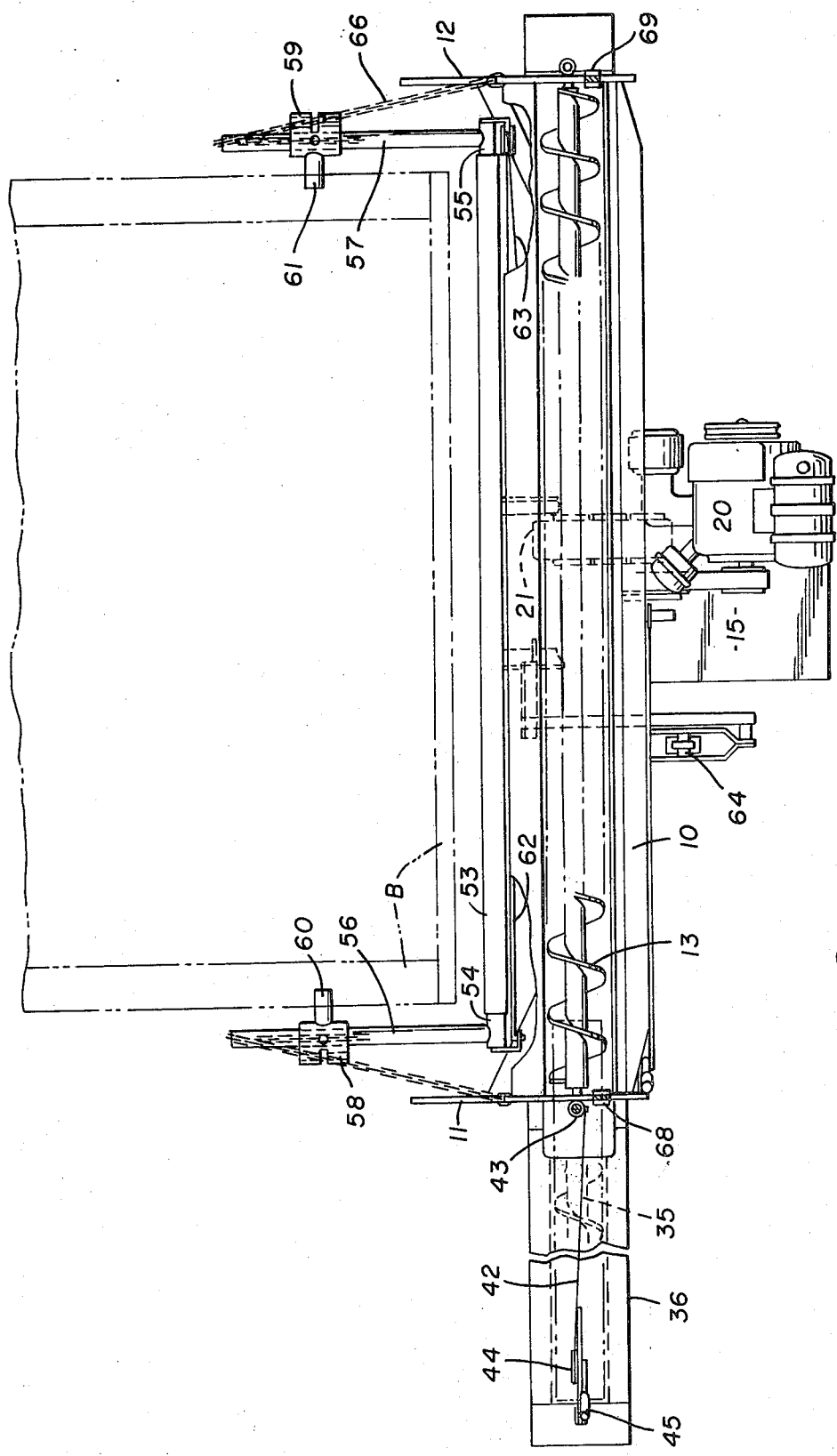
FIG. 2 is a top plan view on line 2—2 of FIG. 1 with broken lines indicating a portion of a dump truck body.
Figure 3:
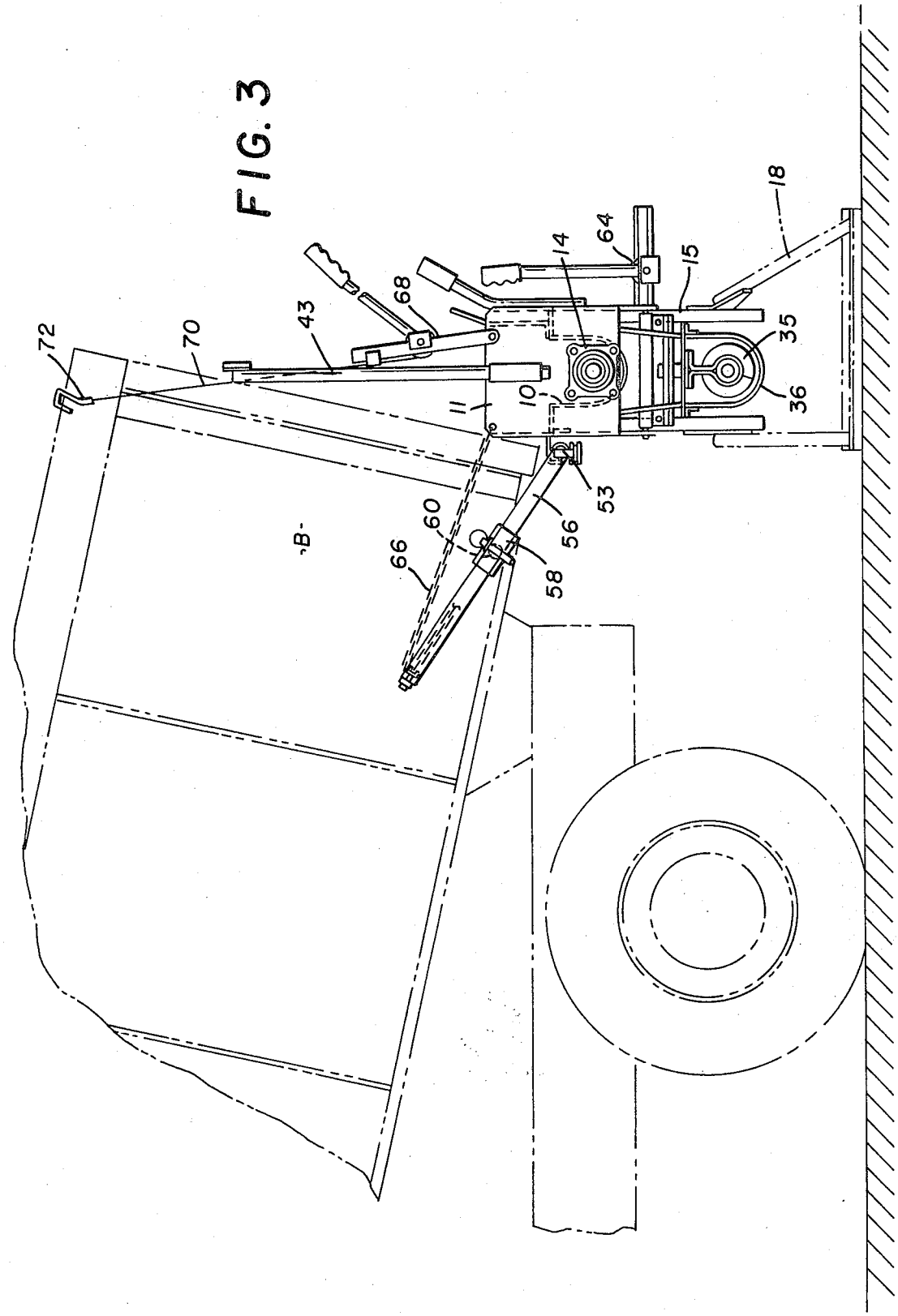
FIG. 3 is an end elevation on line 3—3 of FIG. 1 with broken lines indicating a portion of a dump truck and, FIG. 4 is a front elevation of the tailgate loader showing the reversal of the extension conveyor from the left to the right end thereof. Broken lines indicate the tailgate of a dump truck.
Figure 4:
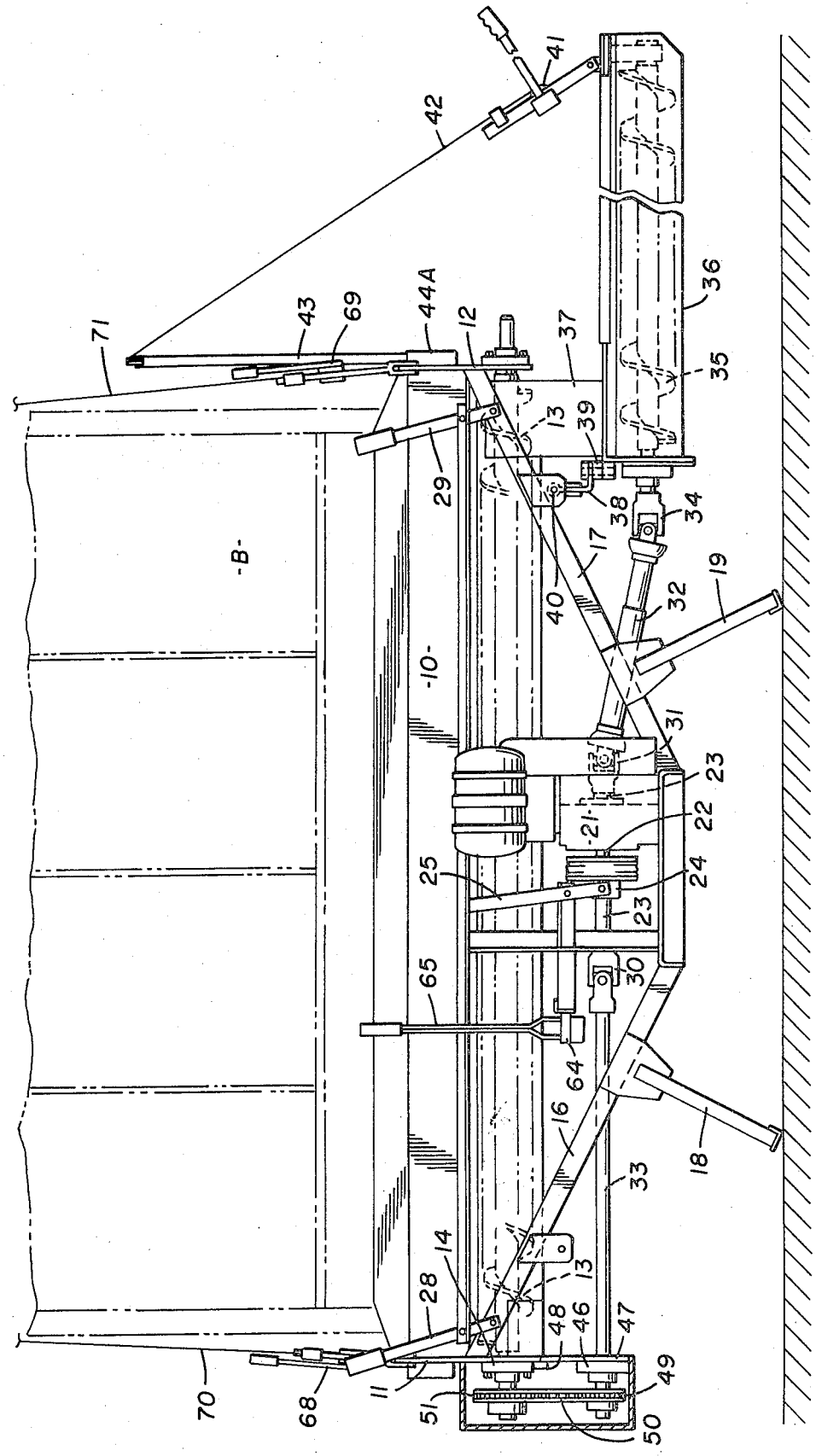

As shown in FIGS. 1 and 2 of the drawings, rotary motion from the engine 20 is conveyed by way of the gear box 21 to the drive shafts 23 and 33 and will thus simultaneously operate the main conveyor screw 13 of the tailgate conveyor and the extension conveyor screw 35. As hereinafter explained the extension conveyor 36 may be removed from its position on the left end of the tailgate conveyor as seen in FIGS. 1, 2 and 3 of the drawings and repositioned on the right end of the tailgate conveyor as seen in FIG. 4 of the drawings. When this occurs the gears 49 and 51 and the interconnecting chain 50 are also moved to the other end of the device.

Those skilled in the art will observe that a tailgate conveyor to be operative when a truck supplying it with material is moving, must be attached to the truck as well as supported thereby. The present invention provides novel means for such attachment and support and by referring to FIGS. 2 and 3 of the drawings in particular it will be seen that the attachment means comprises a transversely extending housing 53 attached to the back of the open topped housing 10 and the frame 15 thereof in which a pair of tubular members 54 and 55 are telescopically mounted. Each of the tubular members 54 and 55 are provided with projecting arms 56 and 57 respectively and these in turn are provided with adjustable brackets 58 and 59 slidable thereon and incorporating pins 60 and 61 for engagement with the opposite sides of a dump truck body B as seen in broken lines in FIGS. 2 and 3 of the drawings. Springs in the housing 53 urge the members 54 and 55 outwardly.

Cables 62 and 63 are attached to the outer opposite ends of the tubular members 54 and 55 and extend over a plurality of pulleys to a winch 64 mounted on a sideward extension of the frame 15 are provided with a vertically extending handle 65 by which it may be actuated to tighten the cables 62 and 63 and thus move the tubular members 54 and 55 inwardly of the transverse extending housing 53 which action will engage the pins 60 and 61 against the sides of the truck body B so as to both center and align the tailgate conveyor with the truck body and more particularly the tailgate thereof and at the same time frictionally attach the same thereto so that it can be moved along with the truck.

By referring to FIGS. 2 and 3 of the drawings it will be seen that chains 66 and 67 are attached to the ends 11 and 12 of the open topped housing 10 and extend to the outer ends of the arms 57 and then inwardly thereof to engage pins positioned through the brackets 58 and 59 respectively whereby the arms are held in desired position.

Those skilled in the art will observe that it will be necessary to support the tailgate conveyor with respect to the truck body so that it can be maintained in operating position thereon when the truck is moving as for example when asphaltic material is being received therefrom by the tailgate conveyor and delivered to a curb forming machine or the like operating in spaced relation to the truck and the supply of asphaltic concrete necessary.

In FIGS. 1 and 3 of the drawings, winches 68 and 69 are shown attached to the ends 11 and 12 respectively of the open topped housing 10 and attached to cables 70 and 71 respectively which are provided with hooks 72 on their opposite ends. The hooks 72 are adapted to be positioned over the upper side or end walls of the truck body B as best seen in FIG. 3 of the drawings and operation of the winches 68 will thereby lift the tailgate conveyor vertically while it is held in desirable position by the arms 56 and 57 and their attachments heretofore described.

It will occur to those skilled in the art that it may frequently be desirable to deliver asphaltic material or the like from the truck body and the tailgate conveyor specifically to the opposite side from that illustrated in FIGS. 1, 2, and 3 of the drawings and by referring to FIG. 4 of the drawings, it will be seen that this is readily accomplished by moving the conveyor extension 36 to the opposite end of the tailgate conveyor and attaching it thereto.

Still referring to FIG. 4 of the drawings, it will be seen that the driven shaft 33 has been disconnected and relocated from the position illustrated in FIG. 1 of the drawings and now appears on the left side of the machine attached to the coupling 30 and with its outer end journeled in the bearing 46 which is mounted on the mounting plate 47 which has also been removed from the opposite end of the machine where it was illustrated in FIG. 1 of the drawings and reattached on the left end as seen in FIG. 4. The gears 49 and 51 and the connecting chain 50 have also been removed from the right end of the device as seen in FIG. 1 of the drawings and repositioned on the left end as seen in FIG. 4 of the drawings, and rotary motion from the gear box 21 will now be conveyed by the relocated driven shaft 33 to the opposite end of the main conveyor screw 13 which will accordingly be rotated in reverse direction as compared with its direction of rotation in FIG. 1 of the drawings.

The drive shaft 32 has been relocated from the position shown in FIG. 1 of the drawings to the right side of the drive mechanism as seen in FIG. 4 of the drawings and coupled to the coupling 31 and the coupling 34 which is secured to the end of the extension conveyor screw 35, and the extension conveyor 36 in which it is located is held by the cable 42 with its winch 41 and attached to the tailgate conveyor by the mast 43 all of which are relocated along with the extension conveyor 36 as will be readily understood by those skilled in the art.

In the position illustrated in FIG. 4 of the drawings the device will operate to deliver material from the truck via the open topped housing 10 of the tailgate conveyor to the right thereof through the extension conveyor 36.

It will thus be seen that the invention disclosed herein is capable of delivering any flowable material from a truck to a point remote from either side thereof, that the device includes easily actuated positive locating means for aligning the same with the truck from which it will receive material and that it is readily attached to and carried by the truck with adjustable readily operated means to elevate it or lower it as desired. The delivery of such material through the extension conveyor is entirely flexible and may vary as to height and sideward position as the extension conveyor is movable both horizontally and vertically relative to the main conveyor of the device of the invention.

Although but one embodiment of the present invention has been illustrated and described it will be apparent to those skilled in the art that various changes and modifications may be made therein without departing from the spirit of the invention.

I claim:

1. A tailgate conveyor for attachment to a dump truck and consisting of a framework, a first open topped housing on said framework with an elongated screw therein arranged for delivery of material at either end, an extension conveyor consisting of a secondary open topped housing having a secondary elongated screw therein, said secondary open topped housing removably attached to said framework at one end thereof and partially below one end of said first housing and arranged for relocation to the other end thereof, means for adjustably positioning said extension conveyor relative to said main conveyor and drive means for said conveyors midway of said framework, oppositely disposed drive shafts removably connecting said conveyors and said drive means and means on said tailgate conveyor for engaging said dump truck and arranged to align said open topped housing therewith, said means for engaging the truck body consisting of a transverse housing, a pair of members telescopically engaged in said housing, means urging said members outwardly thereof, arms on said members at right angles thereto, brackets on said arms and means on said brackets for engaging the opposite sides of a dump truck, and means for moving said members and arms toward one another and said truck body simultaneously so as to attach said tailgate conveyor thereto.

2. The tailgate conveyor of claim 1 and wherein said drive means include an engine and a gear reduction box with said drive shafts extending outwardly and oppositely with respect to said gear box, a clutch means interconnecting said engine and said gear box and a control lever for said clutch means, links connecting said control lever and extending to positions at the opposite ends of said tailgate conveyor.

3. The tailgate conveyor of claim 1 wherein one end of said secondary conveyor screw extends outwardly of said secondary housing and a coupling including a universal joint is positioned thereon and engaged by one of said drive shafts whereby rotary motion from said gear box may be imparted thereto.

4. The tailgate conveyor of claim 1 wherein said means for adjustably positioning said extension conveyor include horizontal and vertical pivots interconnecting said extension conveyor and said tailgate conveyor, a mast on said tailgate conveyor and a winch and cable attached thereto and to said extension conveyor for supporting the free end of said extension conveyor.

5. The tailgate conveyor of claim 1 and wherein said elongated screw is disposed in said first open topped housing with the ends thereof extending outwardly of the ends of said housing, removable gear assemblies for said ends of said conveyor screw and said drive shafts whereby said drive shafts and gears may be operatively positioned on either end of said tailgate conveyor for driving said conveyor screws.

* * * * *